(12) United States Patent
Goyal

(10) Patent No.: US 7,450,726 B2
(45) Date of Patent: Nov. 11, 2008

(54) HEADSET DETECTOR IN A DEVICE GENERATING AUDIO SIGNALS

(75) Inventor: Amit Goyal, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 761 days.

(21) Appl. No.: 10/708,556

(22) Filed: Mar. 11, 2004

(65) Prior Publication Data

US 2005/0201568 A1 Sep. 15, 2005

(51) Int. Cl.
*H04R 1/00* (2006.01)
*H04M 1/00* (2006.01)
*H01H 47/00* (2006.01)

(52) U.S. Cl. .................. 381/74; 307/125; 455/575.2

(58) Field of Classification Search .................. 381/74, 381/309, 87; 307/125; 439/668; 455/575, 455/568
See application file for complete search history.

(56) References Cited

U.S. PATENT DOCUMENTS 6,594,366 B1 * 7/2003 Adams ..................... 381/74
6,856,046 B1 * 2/2005 Scarlett et al. ............ 307/125

* cited by examiner

*Primary Examiner*—Ping Lee
(74) *Attorney, Agent, or Firm*—Warren L. Franz; Wade James Brady, III; Frederick J. Telecky, Jr.

(57) ABSTRACT

A detector circuit detects whether a headset is present (inserted) in a jack by measuring the impedance between the connection points of the jack. The detector circuit further determines the headset type (e.g., whether of cellular headset, stereo headset or stereo+cellular headset) by measuring the impedance between the connection points of the jack. Power consumption may be reduced by powering down components which determine headset type if the headset is determined not to be present. Additional power reduction is attained by checking for headset removal only periodically if the headset is determined to be present.

14 Claims, 9 Drawing Sheets

HEADSET DETECTOR IN A DEVICE GENERATING AUDIO SIGNALS

BACKGROUND OF INVENTION

1. Field of the Invention

The present invention relates to devices such as smart phones which generate audio signals, and more specifically to a headset detector in such a device.

2. Related Art

Devices such as radios, mobile phones, MP3-players, tape recorders often generate audio signals (e.g., music or voice). In a typical scenario, an analog signal (or digital data) representing the audio signal is received either from a local medium (e.g., audio tape, laser disk) or from an external source (e.g., network, air), and audio signals are generated for the users.

Headsets are often used associated with such devices. A headset generally refers to an apparatus which has one or more earphones that can be placed in the proximity of the ears of a user, and the audio signals generated by the device can be heard by the user by inserting a pre-specified end into the device. The audible signals are received through the headset and heard by the user having an earphone close to the ear.

A device may contain a headset detector to provide various features. For example, a prior embodiment may contain a mechanical switch which moves into a specific position when a headset is inserted into the device, and a headset detector detects the presence of the headset based on the position of the mechanical switch. The device may operate differently (e.g., play audio signals only through the headset if the headset is present) depending on whether the headset is detected to be present or absent.

One problem with such a mechanical switch based solution is that mechanical implementations are generally susceptible to failure and the complexity of integrating the corresponding solutions into electrical/electronic devices is high. In addition, the mechanical implementations are generally space consuming. At least for some of such reasons, it is generally desirable to provide an improved approach by which the presence (upon insertion) of a headset can be detected.

In addition, it may be desirable for the headset detector to detect the type of headset inserted into the device. As is well known, headsets are of multiple types, each generally suited for specific devices and environments. For example, a stereo headset contains two speakers and no microphone, can be used to play music, and is suited for use associated with MP3 player type of devices. On the other hand, a cellular headset used associated with mobile phones contains a speaker and a microphone, and enables a user to place/answer a call. As another example, a stereo+cellular headset contains two speakers and a microphone, and can be used as a combination of stereo and cellular headsets.

Once the headset type is detected, a device may interface as suited for the specific headset. Such a feature may be particularly useful in devices such as smart phones which may operate as cell phone, MP3 player, radio, etc., and a single/common jack may be provided to insert any of the headset types. Based on the type of headset detected to be present in the jack, a device can operate to perform only the specific features supported by the headset. Advantages such as using all the available resources (e.g., electrical power, processing power) only for the relevant features may be attained as a result.

BRIEF DESCRIPTION OF DRAWINGS

The present invention will be described with reference to the following accompanying drawings.

DETAILED DESCRIPTION

1. Overview

A headset detector provided according to an aspect of the present invention determines whether a headset is present in a jack by measuring the impedance between at least a pair of the connection points of the jack. A signal may be generated with a first logical value if the headset is determined to be present, and with the other logical value otherwise. Due to such a feature, the presence of a headset in the jack can be detected without potentially using mechanical movement (as noted above in the related art section) of switches, etc.

According to another aspect of the present invention, a type of headset inserted into a jack may be determined by measuring the impedance between various connection points of the jack. In one embodiment, a headset detector determines whether an inserted headset is a stereo headset, cellular headset or stereo+cellular headset.

Various aspects of the present invention are described below with reference to an example problem. Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well-known structures or operations are not shown in detail to avoid obscuring the invention.

2. Example Environment

Figure 1:
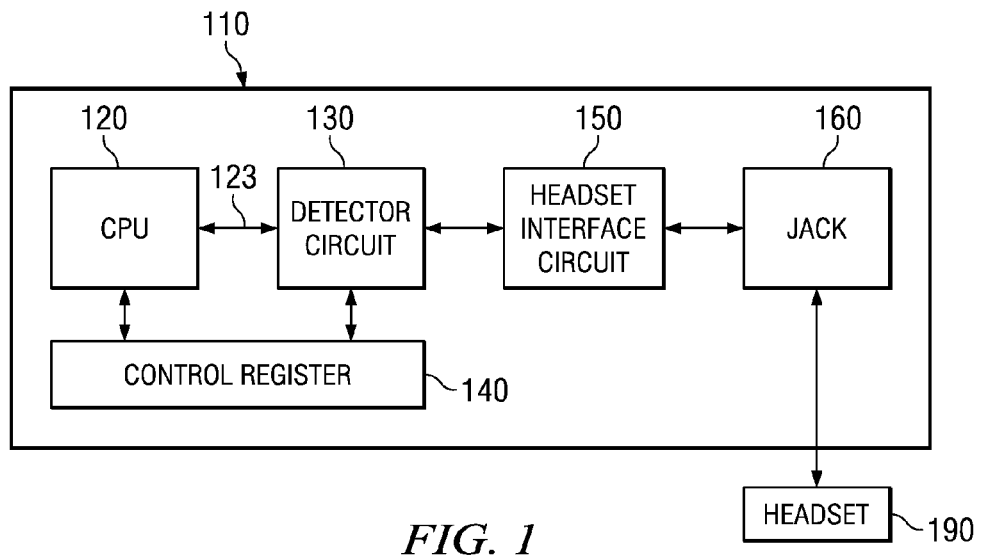
FIG. 1 is a block diagram illustrating an example device in which the present invention may be implemented.

FIG. 1 is a block diagram illustrating an example environment in which various aspects of the present invention may be implemented. The environment is shown containing device 110 and headset 190. Device 110 is further shown containing central processing unit (CPU) 120, detector circuit 130, control register 140, headset interface circuit 150 and jack 160. Only the relevant components to describe the present invention in device 110 are shown, however, device 110 may contain many other components. Each component is described below.

Headset 190 can be any one of various types of headsets (an end of) which can be inserted in jack 160. In one embodiment, the headset types include stereo headset, cellular headset and stereo+cellular headset. The description is provided with only three types of headsets for illustration, however, headset 190 may include other types of headsets without departing from the scope and spirit of various aspects of the present invention.

Jack 160 is designed to receive various types of headset. In one embodiment, jack 160 supports any type of headset with 3-wires or 4-wires (as described below in further detail with respect to FIG. 2). By using a common jack for different headset types, the space and component requirements in device 110 may be reduced.

Headset interface circuit 150 provides an interface between headset 190 and detector circuit 130. Typically, two types of headset interface circuits are used—cap interface and capless interface, which are further described in detail in sections below. Due to various features of the present invention, headset interface circuit 150 may be implemented without requiring mechanical components (i.e., position of switch moving physically) noted in the background section above.

Control register 140 contains bits (memory) to store data representing various status information determined by detector circuit 130. For example, control register 140 stores the bits representing headset detection, headset removal, type of headset, button press detection (in the case of cellular and stereo+cellular headset, as described in sections below), etc.

CPU 120 controls various operations of the components in detector circuit 130 based on the status indicated in control register 140 and interrupts received from detector circuit 130 on path 123. For example, CPU 120 sends control signal on path 123 to power down the components in detector circuit 130 until insertion of headset is detected if headset detection bit in control register 140 indicates headset is not inserted in a jack.

Detector circuit 130 may detect the type of headset inserted, insertion/removal of headset, button press, etc., according to various aspects of the present invention. Detector circuit 130 updates the corresponding bits in control register 140. In addition, detector circuit 130 sends interrupt signals to CPU 120 on path 123 upon detection of various events (insertion of headset, etc.).

The operation of detector circuit 130 depends on the specific structure of jack 160. As noted above, jack 160 is used as a common jack for all three types of headset. Thus, it is helpful to understand the structure of various types of jacks in general.

3. Jacks

Figure 2A:
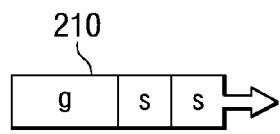
FIG. 2A is a diagram illustrating the details of a jack suitable for a stereo headset in one embodiment.
Figure 2B:
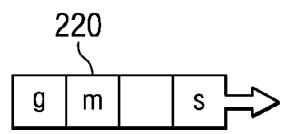
FIG. 2B is a diagram illustrating the details of a jack suitable for a cellular headset in one embodiment.
Figure 2C:
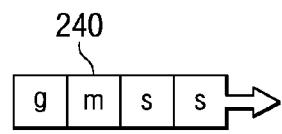
FIG. 2C is a diagram illustrating the details of a jack suitable for a stereo+cellular headset in one embodiment.

FIGS. 2A, 2B and 2C are diagrams together illustrating the details of various jacks suitable for different types of headsets. In particular, jacks 210, 220 and 240 are respectively suitable for stereo headset, cellular headset and stereo+cellular headset application. In FIGS. 2A, 2B and 2C, the notations g, m, and s respectively represent connection points to ground, microphone and speaker(s) in headsets.

Jack 210 is shown containing connection points represented as g, s and s. Two speakers in stereo headset can be connected to s and s connection points, and ground can be connected to g point. Jack 220 is shown containing connection points g, m and s. Microphone and speaker in cellular headset are connected to m and s points respectively. Similarly, jack 240 is shown containing connection points g, m, s and s. Two speakers and microphone in stereo+cellular headset are connected to s, s and m respectively.

Jack 240 can be used as a common jack to connect all kinds of headsets since jack 240 contains four connection points, which would provide connections to both 3-wire and 4-wire headsets. A jack of type jack 240 may be used for jack 160 of FIG. 1. However, jacks 210 or 220 may be used for jack 160 for some aspects of the present invention. The connections for different headsets to the common jack (240) are described below with reference to FIGS. 3A, 3B an 3C.

4. Connection of Various Headsets to a Common Jack

Figure 3A:
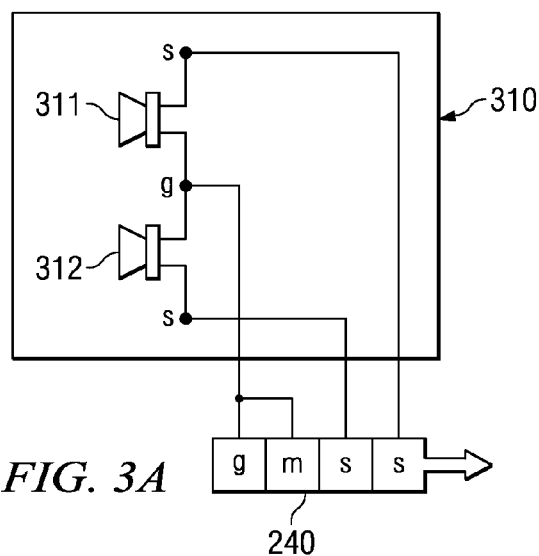
FIG. 3A is a connection diagram illustrating the details of connections for stereo headset to a common jack in one embodiment.
Figure 3B:
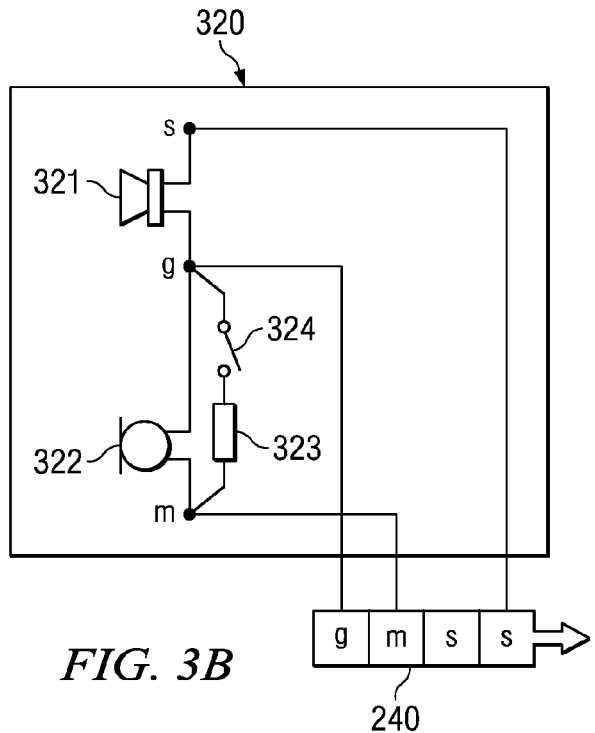
FIG. 3B is a connection diagram illustrating the details of connections for cellular headset to a common jack in one embodiment.
Figure 3C:
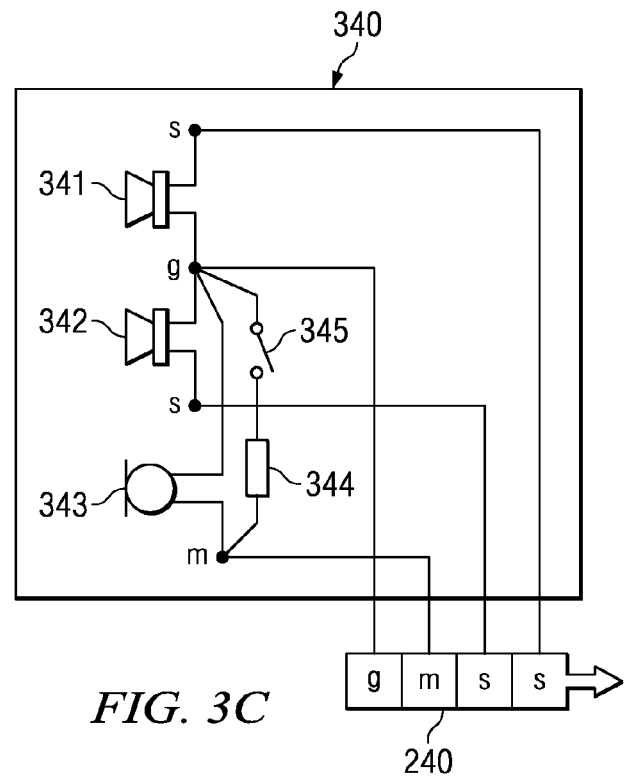
FIG. 3C is a connection diagram illustrating the details of connections for stereo+cellular headset to a common jack in one embodiment.

FIGS. 3A, 3B and 3C are connection diagrams together illustrating the details of connections for various headsets to a common jack in one embodiment. In particular, FIG. 3A illustrates the connections of stereo headset 310 to common jack 240, FIG. 3B illustrates the connections of cellular headset 320 to common jack 240 and FIG. 3C illustrates the connections of stereo+cellular headset 340 to common jack 240. Each of stereo headset 310, cellular headset 320 and stereo+cellular headset 340 may be used in the position of headset 190 of FIG. 1.

With reference to FIG. 3A, stereo headset 310 is shown containing speakers 311 and 312. Each speaker 311 and 312 in turn contains two terminals s and g. The s terminal from each speaker 311 and 312 is connected to each of s (connection) points on jack 240 and g terminal from both speakers 311 and 312 is connected to g point on jack 240. In addition, the g point and m point on jack 240 are connected since stereo headset 310 does not contain microphone.

With reference to FIG. 3B, cellular headset 320 is shown containing speaker 321, microphone 322, resistor 323 and button 324. Resistor 323 and button 324 are connected in sequence and together are connected in parallel to microphone 322. Resistor 323 has a small resistance value, for example, 100 ohms. Button 324 is used to start or stop a call (depending on the prior state).

Speaker 321 in turn contains two connecting terminals s and g, and microphone 322 contains connecting terminals m and g. The s terminal of speaker 321 is connected to one s point on jack 240, the m terminal of microphone 322 is connected to the m point on jack 240 and the g terminal from both speaker 321 and microphone 322 is connected to the g point on jack 240. Another s point on jack 240 remains floating (no connection) since cellular headset 320 contains only one speaker.

With reference to FIG. 3C, stereo+cellular headset 340 is shown containing speakers 341 and 342, microphone 343, resistor 344 and button 345. Resistor 344 and button 345 operate similar to resistor 323 and button 324 of cellular headset 320, respectively. Each speaker 341 and 342 in turn contains two connecting terminals s and g and microphone 343 contains connecting terminals m and g. The s terminal of each speaker 341 and 342 is connected to a corresponding s point on jack 240, the m terminal of microphone 343 is connected to the m point on jack 240 and the g terminal from speakers 341, 342 and microphone 343 is connected to the g point on jack 240.

Headsets are connected to detector circuit 130 through headset interface circuit 150. The description is continued with reference to example headset interface circuits.

5. Headset Interface

Figure 4:
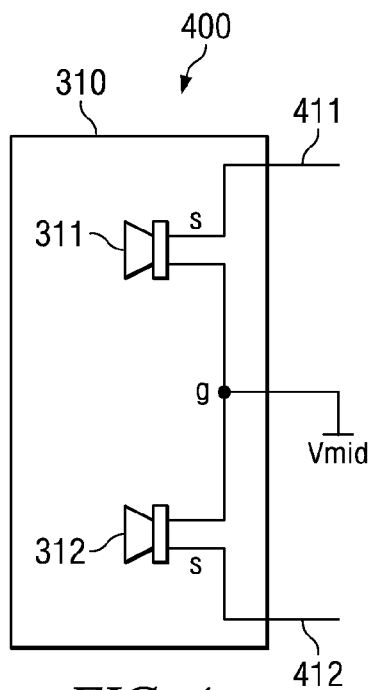
FIG. 4 is a circuit diagram illustrating the details of a cap-less interface to a headset.
Figure 5:
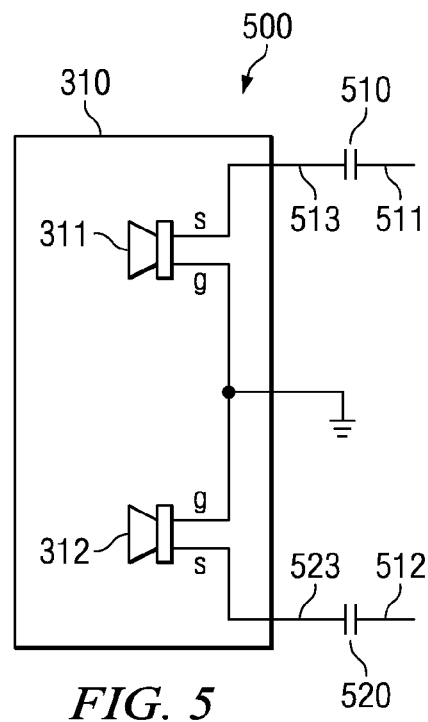
FIG. 5 is a circuit diagram illustrating the details of a cap interface to a headset.
Figure 6:
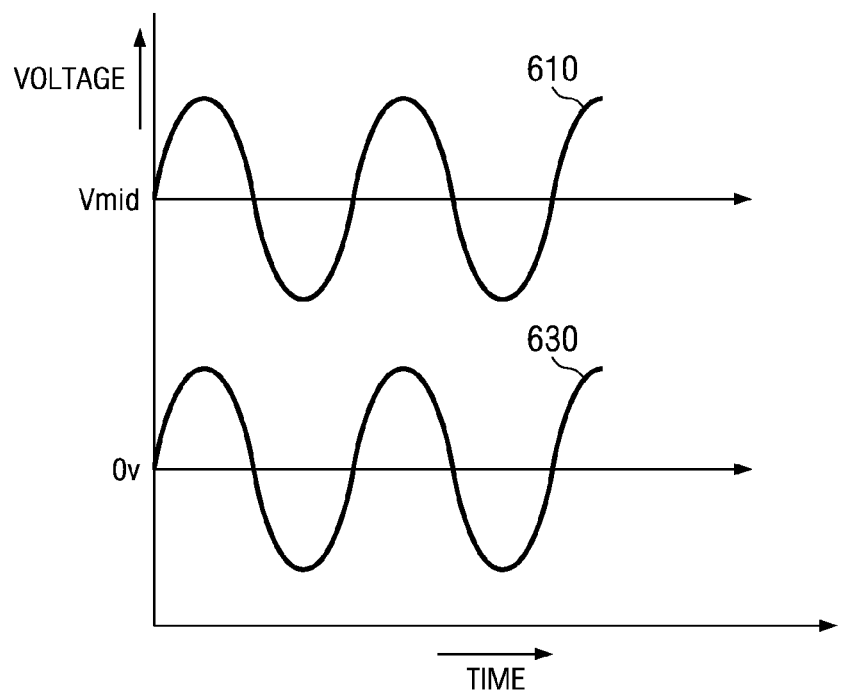
FIG. 6 is a timing diagram illustrating the details of signals in cap-less interface and cap interface.

FIGS. 4, 5 and 6 together illustrate the details of headset interface circuit 150 in one embodiment. Merely for illustration, use of the headset interface with stereo headset 310 is described, however, similar approaches can be used with other types of headsets. Two types of headset interfaces are typically used: cap-less interface and cap interface, which are further described below with reference to FIGS. 4 and 5, respectively.

FIG. 4 is a circuit diagram illustrating the details of cap-less interface 400 with headset 310 in one embodiment. In comparison to capacitor-based interface of FIG. 5 (described below), cap-less interface 400 does not contain capacitors (cap). Stereo headset 310 receives a signal representing the audio (e.g., Music) to be played by speakers 311 and 312 on paths 411 and 412.

In general, the signal on paths 411 and 412 changes both in positive and negative directions with reference to a common voltage (Vmid) such that the average value is zero. The g terminal of speakers 311 and 312 is connected to a voltage equal to Vmid. The difference of voltage levels on g (Vmid) and s terminals (signals on paths 411 and 412) would cause the signal across speakers 311 and 312 to change with respect to zero voltage level and any D.C. (Vmid) voltage does not appear across the speakers. The D.C. voltage applied to speakers 311 and 312 would otherwise decrease the lifetime of the speakers.

FIG. 5 is a circuit diagram illustrating the details of a cap interface connected to headset 310 in one embodiment. Cap interface 500 is shown containing capacitors 510 and 520. Capacitors 510 and 520 receive the audio signal on paths 511 and 512 respectively. The signals on paths 511 and 512 are similar to signal on paths 411 and 412 of FIG. 4 respectively. Each capacitor 510 and 520 block the D.C. (direct current) voltage (Vmid) and provides only the changes in the signal with respect to zero voltage on paths 513 and 523.

Stereo headset 310 receives a signal representing the audio (e.g., Music) to be played by speakers 311 and 312 on respective paths 513 and 523. The g terminal of speakers 311 and 312 is connected to ground. As a result, the signal on paths 513 and 523 does not contain D.C. components. The D.C. components otherwise applied to speakers 311 and 312 would decrease the lifetime of the speakers. The manner in which various signals would change is described below.

FIG. 6 is a timing diagram illustrating the details of various signals in cap-less interface 400 and cap interface 500. Line 610 represents the audio signals received on each of paths 411 and 412 of FIGS. 4 and 511 and 512 of FIG. 5. It may be appreciated that lines 610 and 630 are shown as sinusoidal signals merely for illustration. In reality, the shape is determined by the audio signals.

Line 630 represents the signal that would appear across each of speakers 311 and 312 of FIG. 4 and on paths 513 and 523 of FIG. 5. Line 610 changes with respect to a common voltage level of Vmid such that the average value is zero. With respect to FIG. 5, line 630 changes with respect to zero voltage level due to dc blocking in cap interface 500. With respect to FIG. 4, line 630 changes with respect to zero voltage due to the Vmid voltage applied to g terminal of speakers 311 and 312.

Detector circuit 130 performs various operations in accordance with various aspects of the present invention, in addition to providing the audio signals to speakers 311 and 312. The manner in which detector circuit 130 may be implemented with cap-less interface is described first with reference to FIG. 7, and with cap interface is described later with reference to FIG. 13.

6. Detector Circuit with Cap-Less Interface

Figure 7:
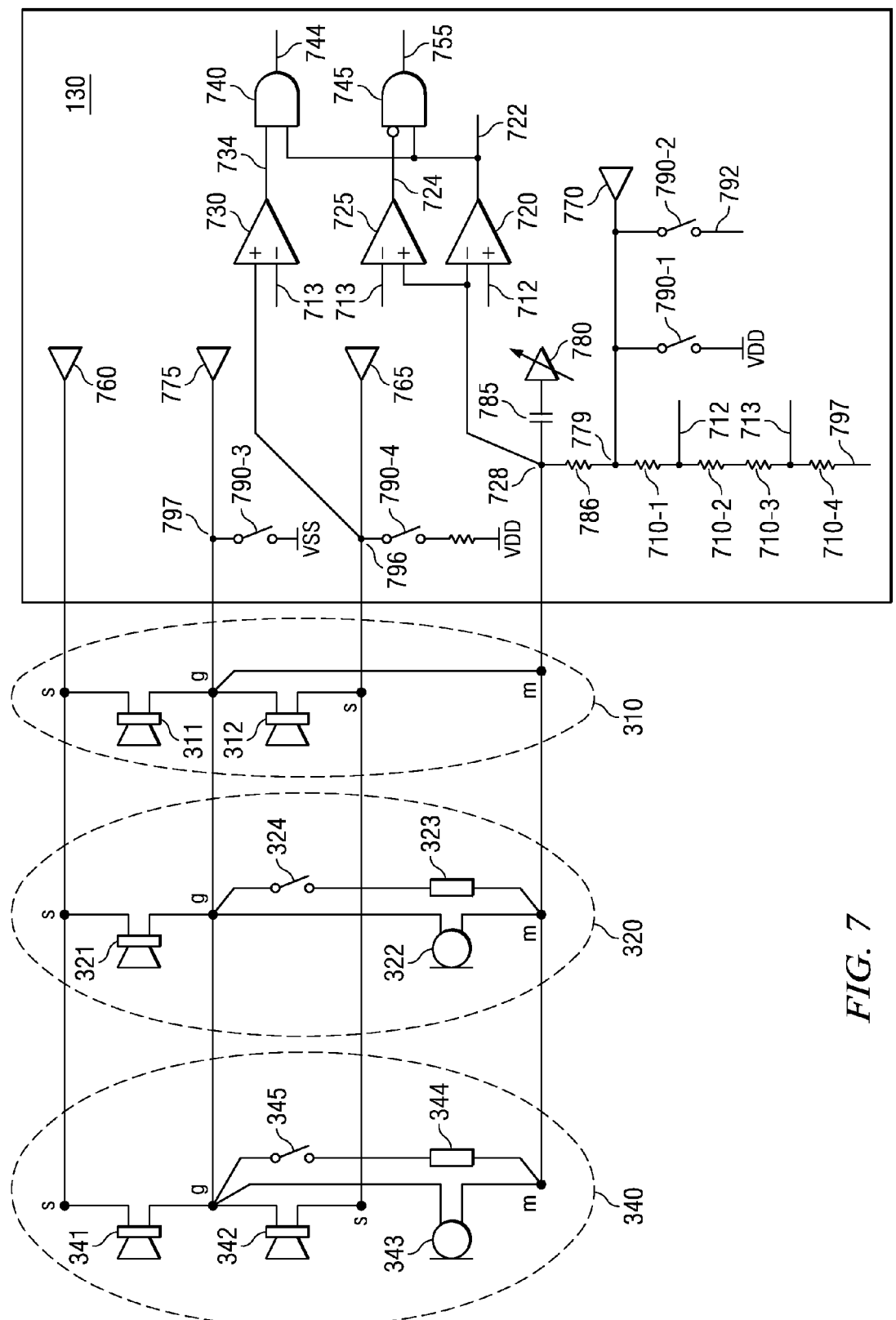
FIG. 7 is a circuit diagram illustrating the details of a detector circuit with a cap-less interface in an embodiment of the present invention.

FIG. 7 is a circuit diagram illustrating the details of detector circuit 130 with cap-less interface 400 in an embodiment of the present invention. Merely for illustration, all of headsets 310, 320 and 340 are shown connected to detector circuit 130, however, only one of headsets 310, 320 and 340 is connected at any instant of time.

Detector circuit 130 is shown containing resistors 710-1 through 710-4 and 786, comparators 720, 725 and 730, AND gates 740 and 745, speaker drivers 760 and 765, micbias driver 770, ground voltage driver 775, mic amplifier 780, capacitor 785, and switches 790-1 through 790-4. Each component is described below in further detail.

Resistors 710-1 through 710-4 form a voltage divider network. The voltage divider network divides the voltage (Vbias) received at node 779 into two reference voltage levels equaling 7*Vbias/8 (wherein '*' represents multiplication factor) and Vbias/8, and provides the two reference voltage levels on respective paths 712 and 713. As will be clear from the description below, Vbias is provided by one of micbias driver 770, Vdd (via switch 790-1) and detect pulse on path 792 (via switch 790-2).

Speaker driver 760 drives the specific one of present speakers 311, 321 and 341, with the signal representing audio/music to be played. Speaker driver 765 drives specific one of speakers 312 and 342 in case the inserted headset is of stereo or stereo+cellular type, with the signal representing audio/music to be played.

Ground voltage driver 775 provides the required ground voltage (for example, Vmid as described above with reference to FIG. 4) to the inserted headset. The ground voltage may be generated using power supply (not shown) and may be implemented in a known way. Micbias driver 770 provides the required bias voltage to microphones 322 and 343, in case the inserted headset is of the headset 320 (cellular) or headset 340 (stereo+cellular) type respectively. The signal representing the audio received from microphones 322 and 343 is provided at node 728.

Resistor 786 and capacitor 785 together process the audio signal received from the specific one of microphones 322 and 343. In particular, resistor 786 provides the required bias to microphones 322 and 343 and capacitor 785 filters any DC (direct current) component in the received audio signal at node 728. Mic power amplifier 780 amplifies the d.c filtered audio signal and provides the amplified signal to analog to digital converter (not shown) for further processing.

The remaining components of FIG. 7 are described with reference to each detection feature provided by detector circuit 130. Broadly, the features include detecting each of presence of headset, type of headset inserted, and button press in headset.

7. Presence of Headset

The principle underlying the detection of whether a headset is present in a jack, can be understood by appreciating that the impedance between a pair of connection points in a jack is different with the presence and absence of a headset in the jack. For example, the absence of headset causes high impedance since the connection points are not connected and the presence of headset reduces the impedance since headset provides connection between connection points.

Thus, the presence of headset in a jack may be determined by measuring the impedance between at least a pair of the connection points of the jack. For example, the impedance may measured between the g and m connection points of a jack. A signal may be generated with a first logical value if the headset is determined to be present, and with the other logical value otherwise. Due to such a feature, the presence of a headset in the jack can be detected without potentially using mechanical movement of switches, as described below in further detail.

Continuing with reference to FIG. 7, micbias driver 770 generates the bias voltage (micbias) to operate microphone in headset. The bias voltage may be generated using power supply (not shown) and may be implemented in a known way. Switch 790-1 is opened if micbias driver 770 is turned on, else switch 790-1 is closed such that either Vdd or micbias is provided as Vbias at node 779. Switch 790-3 is closed, which connects node 797 to Vss (ground).

Comparator 720 generates on path 722 a signal having one logical value if a headset is present in jack 240 and another logical value otherwise. Comparator 720 compares the voltage on node 728 with the voltage (7*Vbias/8) received on path 712 and provides the comparison result as headset_detect on path 722. The result on path 722 indicates whether headset is present in jack (240) or not, as described below in further detail.

If headset is not present in jack 240, the voltage on node 728 equals Vbias since nodes 728 and 797 are not connected. In such a situation, headset_detect on path 722 is 0 (corresponding one comparison result) since (7*Vbias/8) on path 712 is less than Vbias on node 728. If headset is present in jack 240, the voltage on node 728 would be below (7*Vbias/8) due to the impedance (represented by Rmic) provided by the headset between nodes 728 and 797. The voltage on node 728 may be given by equation (1) below.

Voltage on node728=Vbias(Rmic/(Rmic+R786))      Equation (1)

wherein R786 represents the resistance of resistor 786 connected between nodes 779 and 728.

In an embodiment, Rmic equals 3 Kiloohms and R786 is chosen as 2.2 Kiloohms. As a result the voltage on node 728 would approximately equal half of Vbias. Due to such low voltage on node 728, a value of 1 is provided on headset_detect 722, indicating that headset is present in jack 240. Therefore, a 1 on headset_detect 722 indicates the presence of headset and a 0 indicates the absence of headset.

Even though the removal/absence of headset may be detected as described above, an aspect of the present invention reduces power consumption to detect removal of a headset after the headset is determined to be present, as described below in further detail.

8. Detecting Removal of Headset While Reducing Power Consumption

As described above, headset removal may be detected by applying voltage Vbias at node 779 continuously while performing detection, which may consume substantial power. However, according to an aspect of the present invention, voltage Vbias at node 779 may be provided for a short duration by using a detect pulse (detect pulse is described in sections below with reference to FIG. 8). As a result, current flows through various components in detector circuit 130 for a short duration and thus power consumption may be reduced as described below in further detail.

Continuing with reference to FIG. 7, ground bias driver 775 provides ground bias voltage to an inserted headset, and may be implemented in a known way. If ground bias driver 775 is turned on, micbias driver 770 is also turned on (by appropriate action of CPU 120) to provide the required bias voltage to detect headset removal. In an embodiment, ground bias driver 775 provides a ground bias voltage of 1.5V, micbias driver 770 provides a micbias voltage of 3.3V and Vdd equals 1.8V.

When ground bias driver 775 is turned on and micbias driver 770 is not turned on, the voltage applied to detector circuit 130 would equal 0.3V (1.8V-1.5V), which is small. If micbias driver 770 is turned on, the voltage would equal 1.7V (3.3-1.5), which may be enough to drive various components in detector circuit 130. If both ground bias driver 775 and micbias driver 770 are turned off, switches 790-2 and 790-3 are closed such that the required bias voltage is provided by detect pulse connected on path 792. Local oscillator (not shown) may generate the detect pulse on path 792.

As described above, if headset is inserted, the voltage at node 728 is low, which causes a 1 on path 722 indicating headset is inserted. If headset is removed, nodes 728 and 797 are not connected, which causes the voltage at node 728 to rise (approximately to Vbias). As a result, comparator 720 provides 0 on path 722, which indicates headset is removed.

As may be appreciated from the description above, the removal of headset is checked according to the frequency of pulses on path 792, and by keeping the frequency (and/or pulse duration) low, the power consumption can be minimized.

Once the presence of headset is detected, it may be required to detect the type of headset to perform the corresponding operations (e.g., playing music). The manner in which the type of headset may be detected is described below.

9. Type of Headset Detection While Reducing Power Consumption

The principle underlying the detection of type of headset can be understood by appreciating that the impedance between various connection points in a jack varies for various types of headsets. For example, the impedance between g and m connection points of a jack is small for stereo headset since g and m terminals of stereo headset is shorted and high for both cellular and stereo+cellular headsets due to the presence of microphone between g and m terminals as shown in FIGS. 3A, 3B and 3C. Thus, stereo headset may be detected by measuring impedance between g and m connection points.

Cellular headset is differentiated from stereo+cellular headset by measuring impedance between s and g connection points. Cellular headset offers high impedance between s and g connection points since s connection point is floating (not connected). Stereo+cellular headset offers low impedance due to the presence of a speaker between s and g terminals. Thus, cellular headset may be differentiated from stereo+cellular headset due to the variation in impedance between s and g connection points, as described below in further detail.

Continuing with reference to FIG. 7, comparator 725 generates signals indicating whether the headset is stereo headset or not, and comparator 730 generates signals indicating whether the headset is cellular headset or not. If the headset is neither stereo headset 310 nor cellular headset 320, that indicates the headset is stereo+cellular headset 340. The manner in which the headset may be detected as stereo headset 310 or not is described first below.

Comparator 725 compares the voltage on node 728 with the voltage Vbias/8 received on path 713 and provides the comparison result on path 724. AND gate 745 provides the inversion of the result 724 on path 755 as stereo_hs when headset_detect is 1. The result on path 755 indicates whether headset is stereo headset or not as described below.

While detecting headset type, switches 790-1 and 790-3 are closed (by CPU 120) in case headset_detect path 722 indicates that a headset is inserted in jack 240, thereby forming a path from Vdd to Vss through m and g terminals of the inserted headset. If the inserted headset is of stereo headset (310) type, g and m terminals are shorted, which causes the voltage at node 728 to equal Vss. In such a situation, comparator 725 provides 0 on path 724 since the voltage on node 728 is less than Vbias/8 received on path 713. A 0 on path 724 causes a 1 on path 755, which indicates that the inserted headset is of stereo headset (310) type.

If the inserted headset is not of stereo headset type, connection points g and m of jack 240 are connected to microphone 322 in case the inserted headset is of cellular headset type, and to microphone 343 in case the inserted headset is of stereo+cellular headset type. Each microphone 322 and 343 may provide a relatively high resistance (in one embodiment equaling approximately 3.0 kiloohms) compared to in the case of stereo headset type, which causes the voltage on node 728 to approximately equal Vbias/2.

In such a situation, comparator 725 provides 1 on path 724 since the voltage on node 728 could be higher than Vbias/8 received on path 713. A 1 on path 724 causes a 0 on path 755, which indicates that the inserted headset is not of stereo headset (310) type. The manner in which whether an inserted headset is of cellular headset (320) type or not is described below.

Comparator 730 compares the voltage on node 796 with the voltage Vbias/8 received on path 713 and provides the comparison result on path 734. AND gate 740 provides the result 734 on path 744 as cell_hs when headset_detect path 722 is 1. The result on path 744 indicates whether the inserted headset is of cellular headset type or not as described below.

Switches 790-3 and 790-4 are closed (by CPU 120) in case headset_detect path 722 indicates that a headset is inserted in jack 240 and stereo_hs path 755 indicates that the inserted headset is not of stereo headset type. In case the inserted headset is of cellular headset (320) type, node 796 is not connected to cellular headset 320, which causes Vdd to appear at node 796 due to the connection of node 796 to Vdd through switch 790-4. In such a situation, comparator 730 provides 1 on path 734 since the voltage on node 796 is higher than Vbias/8 received on path 713. A 1 on path 734 causes a 1 on path 744, which indicates the inserted headset is of cellular headset (320) type.

If the inserted headset is not of cellular headset type and if headset_detect 722 indicates that a headset is present, the speaker (of stereo headset 310 and stereo+cellular headset 340, as the case may be) is connected between connection points s and g of jack 240. The connection points s and g are in turn connected to respective nodes 796 and 797. In an embodiment, speaker offers a low resistance in the range of 16 ohms to 64 ohms, which pulls the voltage on node 796 to voltage equaling Vss. In such a situation, comparator 730 provides 0 on path 734 since the voltage on node 796 is less than Vbias/8 received on path 713. A 0 on path 734 causes a 0 on path 744, which indicates the inserted headset is not of cellular headset (320) type.

If both stereo_hs 755 (i.e., inserted headset is not of stereo headset type) and cell_hs (not of cellular headset type) 744 are 0, then the inserted headset is detected as being of stereo+cellular headset (340) type. The results on paths 722, 755 and 744, which respectively indicate headset detection, headset is either stereo headset type or cellular headset type, are stored in control register 140 for further processing by CPU 120 of FIG. 1.

It may be noted that the inserted headset in jack 240 is removed and another headset or same headset is inserted back, then detector circuit 130 detects the type of the headset inserted in jack 240 without having to initialize (reboot, power-up, etc.) device 110.

Once the type of headset is detected, it may be required to perform different operations depending on the type of headset inserted. For example, music/audio may need to be played in case the inserted headset is of stereo headset type and a phone call answered in case the inserted headset is of cellular headset type, etc. However, some of the operations may not be performed until button (324/345) is pressed in case the inserted headset is detected to be of cellular headset 320 or stereo+cellular headset 340 type. The manner in which the pressing of the button (hereafter "button press") may be detected is described below.

10. Button Press Detection

The principle underlying the detection of button press can be understood by appreciating that the impedance between a pair of connection points to which a button is connected is different with button press and without button press in a headset. For example, impedance is high if button is not pressed since switch 324 or 345 (in FIGS. 3B and 3C respectively) is open. The impedance is low if button is pressed since the switch is closed causing an impedance equaling the impedance of resistor 323 or 344 between the connection points. The button is momentarily pressed and released to initiate or end a call.

Thus, button press may be detected momentarily by measuring the impedance between a pair of the connection points of the jack. For example, the impedance is measured between g and m connection points of a jack since the button is connected between g and m connection points in each of cellular headset 320 and stereo+cellular headset 340. The manner in which button press may be detected is described in further detail below.

Comparator 725 generates on path 755 signals indicating whether button is pressed or not. It may be appreciated from the description above, that the same path 755 is also used to indicate whether the headset is stereo headset or not. The same path is conveniently being used for both the purposes since once the type of headset is detected, the type of headset detection may not be performed again until the headset is removed and (potentially a different one) inserted.

Comparator 725 compares the voltage on node 728 with the voltage Vbias/8 received on path 713 and provides the comparison result on path 724. AND gate 745 provides the inversion of the result 724 on path 755 as button_det (indicating whether the button is pressed or not) when headset_detect is 1, as described below.

If button is not pressed, then the resistance (in the range of 3.0 kilo ohms) offered by the inserted headset between nodes 797 and 728 is only due to microphone. Due to the resistance of headset, the voltage at node 728 would approximately equal Vbias/2. In such a situation, comparator 725 provides 1 on path 724 since the voltage on node 728 is higher than Vbias/8 received on path 713. A 1 on path 724 causes a 0 on path 755, which indicates button is not pressed.

If button is pressed, then the resistance offered by the inserted headset between nodes 797 and 728 is due to the parallel combination of microphone (322 or 343) and resistor (323 or 344). In an embodiment, the resistance of each resistor 323 and 344 is small and is 100 ohms. Due to the small resistance of resistors, the voltage at node 728 would approximately equal Vgnd at node 797, which is much less than Vbias/8. As a result, comparator 725 provides 0 on path 724, which causes a 1 on path 755, indicating that the button is pressed.

From the above, it may be noted that detector circuit 130 may detect the presence of headset, type of headset, and button press. It may be further noted that detector circuit 130 may not require a mechanical switch, for example, to perform detection or to interface with an inserted headset. In addition, detector circuit 130 may consume less power to perform detection as described below.

11. Power Consumption Reduction

According to an aspect of the present invention, power consumed by device 110 may be reduced in two scenarios—(1) when headset is not present in jack 240; and (2) when device 110 is in inactive states such as standby mode. The manner in which power consumption can be reduced is described below.

When no headset is inserted into jack 240, it is generally not required to drive the components which generate audio signals. Thus, components which perform operations such as playing, may be powered down until a headset is inserted. An aspect of the present invention takes advantage of such a requirement to reduce power consumption as described below.

Current may be provided only to the components that detect the presence of headset (if a headset is determined not to be already present), but not to other components. Such a result may be appreciated by observing that no path exists for current in detector circuit 130 if headset is not inserted since nodes 728 and 797, which are respectively connected to Vdd and Vss, are not connected.

Even if comparator 725 is also connected to node 728, comparator 725 does not consume current since comparators 725 and 730 are turned on by CPU 120 only when headset_detect on path 722 indicates the presence of headset. Therefore, only comparator 720 consumes power until a headset is inserted in a jack and the power consumed by comparator 720 is small. As a result, minimal power is consumed when headset is not present in jack 240.

With respect to power consumption reduction in inactive state (such as standby mode) and waiting for button press, it is generally not required to drive the components which process a call. For example, when a user is driving, the user may not be able to initiate or end a call even if headset is inserted until the button is momentarily pressed and released. Thus, components which perform operations such as processing a call, may be powered down until button press is detected.

Such a result may be achieved by noting that detector circuit 130 detects button press as described above and the components (such as mic amplifier 780, speaker drivers 760 and 765, and ground bias driver 775) that process a call are powered down until button press is detected. Due to such detection and powering down, the power consumed by device 110 may be reduced. Additional reduction in power consumption may be attained as described below with reference to FIG. 8.

12. Detect Pulse

Figure 8:
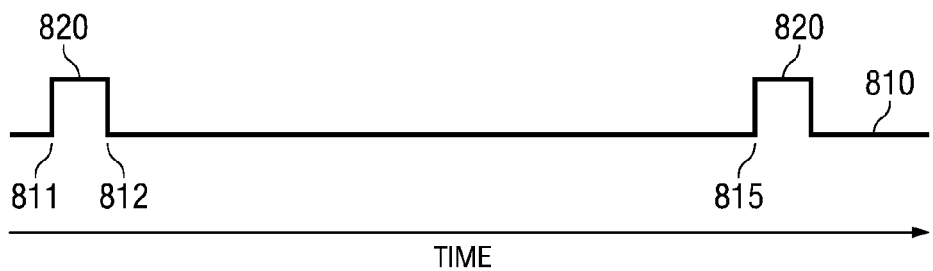
FIG. 8 is a timing diagram illustrating the details of a detect pulse in an embodiment of the present invention.

FIG. 8 is a timing diagram of a detect pulse used to reduce power consumption in an embodiment of the present invention. The detect pulse may be provided on path 792 of FIG. 7. The detect pulse is used to reduce power consumption in some situations wherein substantial power may otherwise be consumed. For example, in case of detecting headset insertion, detector circuit 130 may not consume substantial power since no direct path is present between Vdd and Vss until headset is inserted in jack 240. However, in case of headset removal and button press detection, headset is already present in jack 240, which forms a path and may thus cause substantial power consumption in various components of detector circuit 130.

Thus, in an embodiment, detect pulse on path 792 is applied to detect headset removal and button press, but not in the case of detecting headset insertion. As described above, detect pulse 810 is used to provide the bias voltage (or current) when both micbias driver 770 and ground bias driver 775 are turned off to determine headset removal and button press.

The voltage level of detect pulse (on a time scale) is represented by line 810. Line 810 is shown containing low period pulse 820, which is shown repeated after a long duration at time point 815. Since only detect pulse provided on path 792 is the source of power for detector circuit 130, the total power consumed is determined by the period of detect pulse 820. By choosing a low period for detect pulse 820, the power consumption can accordingly be reduced. The reduction in power consumption may be quantified as described below.

In an embodiment, the time duration of low period pulse 820 would approximately equal 15 φs and the time period of the detect pulse between time points 811 and 815 is 500 φs. The current that would flow through microphone 322 (or 343) equals 300 φA. The average current that would be consumed by microphone 322 (or 343) due to the use of detect pulse 792 is 9 φA (300*15/500=9). A local oscillator that generates detect pulse 792 consumes around 25 φA and various components in detector circuit 130 consume around 10 φA.

Therefore, total power consumption to perform detection is around 44 φA only (=25+10+9). In contrast, without use of the detect pulse (and providing continuous bias voltage), the power consumption could be 310 μA. Accordingly, power consumption is reduced according to an aspect of the present invention.

Thus, detector circuit 130 can be used to detect the presence of headset, the headset type, etc., while consuming minimal power. However, the operation of various components (e.g., switches) of detector circuit 130 may need to be coordinated to attain such features. The manner in which CPU 120 may perform such coordination is described with reference to each feature.

13. Method of Detecting Headset Presence

Figure 9:
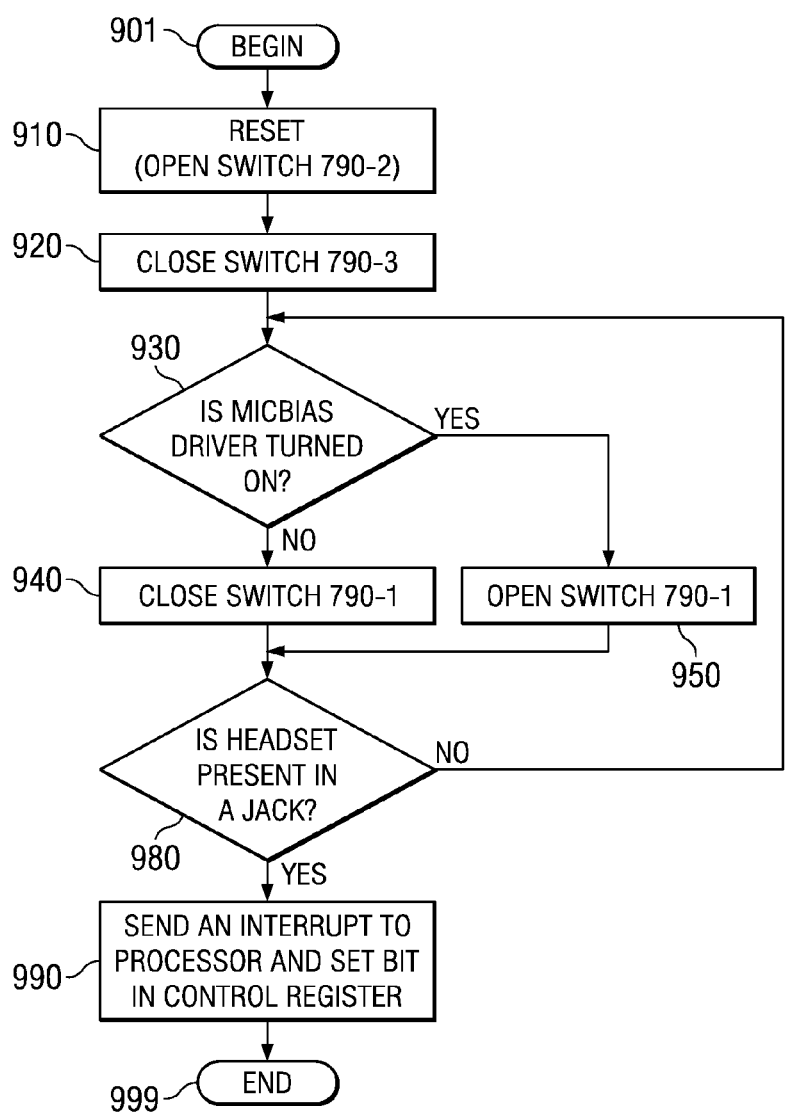
FIG. 9 is a flowchart illustrating the manner in which headset insertion may be detected according to an aspect of the present invention.

FIG. 9 is a flowchart illustrating the manner in which the presence of a headset in a jack may be detected according to an aspect of the present invention. Steps 910-980 of the flowchart may be performed by CPU 120. The method begins in step 901, in which control immediately passes to step 910.

In step 910, switch 790-2 may be opened, for example when device 110 is reset at the time of power on. In step 920, switch 790-3 is closed to provide connection to Vss or ground. In step 930, a determination is made as to whether micbias driver 770 is turned on. As noted above, micbias driver 770 provides the bias voltage to various components in detector circuit 130. If micbias driver 770 is turned on, control passes to step 950, else control passes to step 940.

In step 940, switch 790-1 is closed to provide bias voltage from Vdd since micbias driver 770 is not turned on. Control then passes to step 980. In step 950, switch 790-1 is opened since micbias driver 770 provides the required bias voltage. Control passes to step 980.

In step 980, a determination is made as to whether headset is present in a jack. As described above with reference to FIG. 7, comparator 720 provides a logic value on path 722 indicating whether headset is present in a jack or not. Control passes to step 990 if a headset is present, else control passes to step 920.

In step 990, detector circuit 130 sends an interrupt to CPU 120 and sets bit representing headset_detection to 1 in control register 140. CPU 120 uses the status on headset_detection and sends control signals to perform various operations accordingly. The method ends in step 999. The description is continued with reference to a method in which the type of headset may be detected.

14. Method of Detecting Type of Headset

Figure 10:
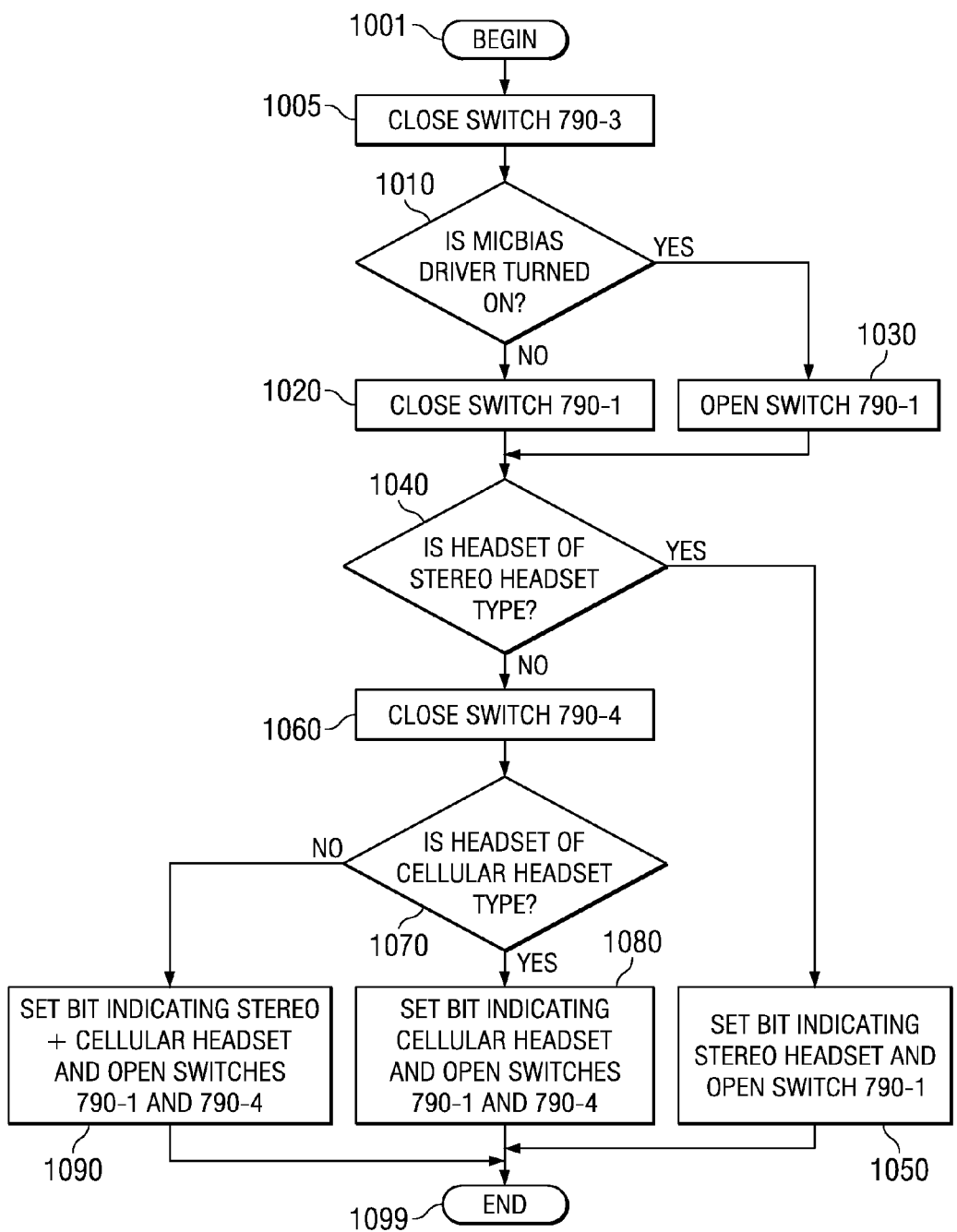
FIG. 10 is a flowchart illustrating the manner in which type of headset may be detected according to an aspect of the present invention.

FIG. 10 is a flowchart illustrating a method in which the type of headset inserted in a jack may be detected according to an aspect of the present invention. All steps except steps 1050, 1080 and 1090 may be performed by CPU 120. The method begins in step 1001, in which control immediately passes to step 1005.

In step 1005, switch 790-3 is closed to provide connection to Vss or ground. In step 1010, a determination is made as to whether micbias driver 770 is turned on to provide the bias voltage to various components in detector circuit 130. If micbias driver 770 is turned on, control passes to step 1030, else control passes to step 1020.

In step 1020, switch 790-1 is closed to provide bias voltage from Vdd since micbias driver 770 is not turned on. Control then passes to step 1040. In step 1030, switch 790-1 is opened since micbias driver 770 provides the required bias voltage. Control again passes to step 1040.

In step 1040, a determination is made as to whether headset is of stereo headset type. As described above with reference to FIG. 7, comparator 725 and AND gate 745 together provide a logic value on path 755 indicating whether headset is stereo headset or not. Control passes to step 1050 if headset is detected to be of stereo headset type, else control passes to step 1060.

In step 1050, detector circuit 130 sets a bit in control register 140 to indicate that a stereo headset type has been detected. CPU 120 uses the status on stereo_hs bit and sends control signals to perform various operations accordingly. In addition, detector circuit 130 opens switch 790-1 to reduce power consumption. Control then passes to step 1099.

In step 1060, switch 790-4 is closed to provide supply voltage to speakers in a headset to determine whether the headset is cellular or stereo+cellular headset. Control passes to step 1070, in which a determination is made as to whether inserted headset is of cellular headset type. Comparator 730 and AND gate 740 together provide a logic value on path 744 indicating whether headset is cellular headset or not. Control passes to step 1080 if a cellular headset type is detected, else control passes to step 1090.

In step 1080, detector circuit 130 sets a bit indicating cellular headset in control register 140 to 1. CPU 120 uses the status on cell_hs bit and sends control signals to perform various operations accordingly. In addition, detector circuit 130 opens switches 790-1 and 790-4 to reduce power consumption. Control passes to step 1099.

In step 1090, detector circuit 130 sets a bit indicating stereo+cellular headset in control register 140 to 1. If headset is determined as not being of stereo headset type in step 1040 and as not cellular headset type in step 1070, that indicates the headset is stereo+cellular headset. CPU 120 uses the status information in control register 140 and sends control signals to perform various operations accordingly. In addition, detector circuit 130 opens switches 790-1 and 790-4 to reduce power consumption. Control passes to step 1099, in which the method ends. The description is continued with reference to a method in which button press and headset removal may be detected if the headset contains a microphone.

Figure 11:
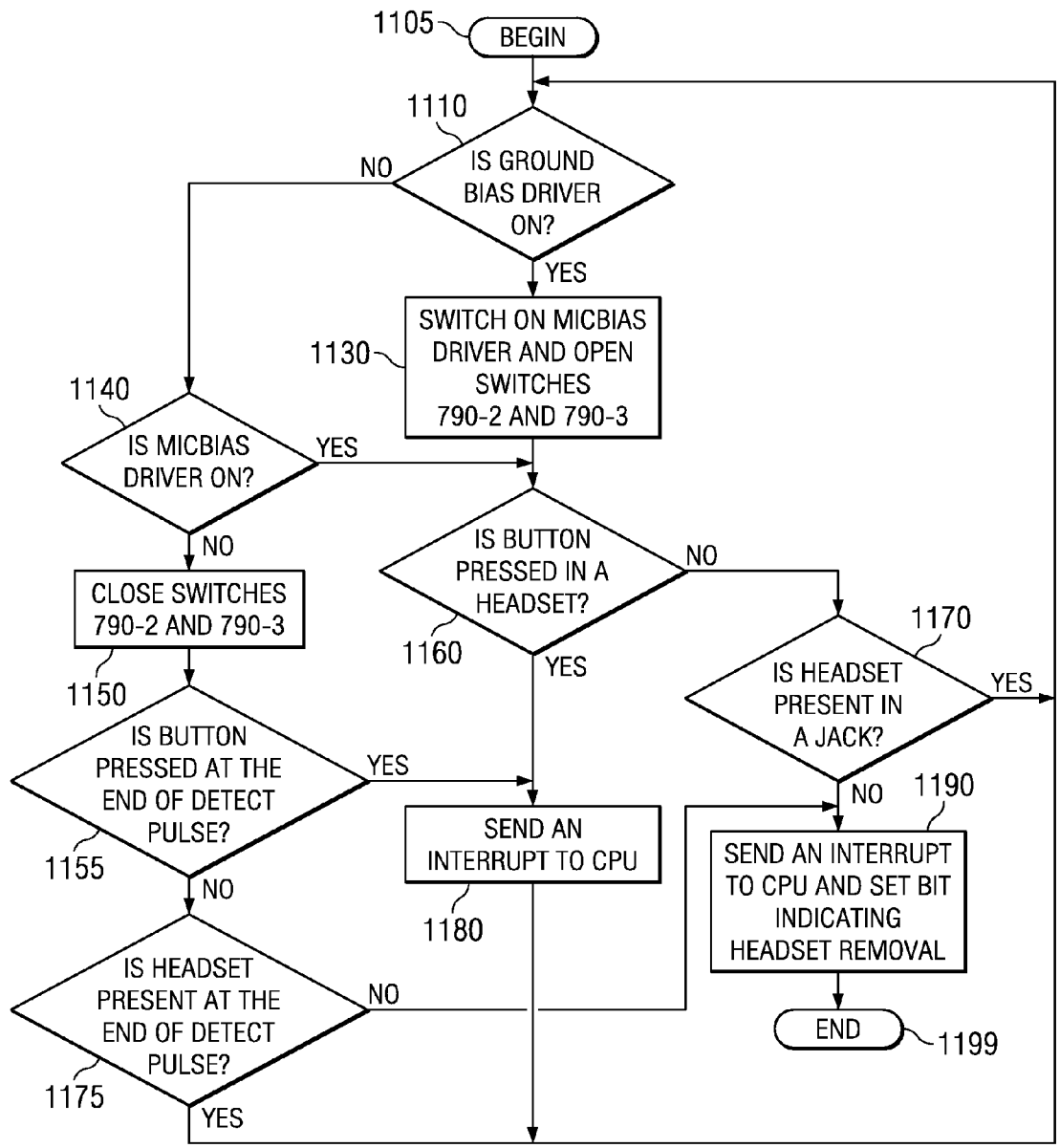
FIG. 11 is a flowchart illustrating the manner in which button press and headset removal may be detected in headsets with a microphone according to an aspect of the present invention.

15. Button Press Detection and Headset Removal Detection in Case of a Headset with Microphone FIG. 11 is a flowchart illustrating the manner in which the button press and headset removal may be detected according to an aspect of the present invention. As described above, button press may need to be detected in cellular headset and stereo+cellular headset, which contain microphone. Steps 1110-1175 may be performed by CPU 120. The method begins in step 1101, in which control immediately passes to step 1110.

In step 1110, a determination is made as to whether ground bias driver is turned on. As noted above, ground bias driver 775 provides the required ground bias voltage (for example, Vmid) to speakers in headset. If ground bias driver 775 is turned on, control passes to step 1130, else control passes to step 1140.

In step 1130, micbias driver is switched on to provide the bias voltage to various components in detector circuit 130. In addition, switches 790-3 and 790-2 are opened since micbias driver 770 and ground bias driver 775 provide the bias voltage. Control passes to step 1160.

In step 1140, a determination is made as to whether micbias driver is turned on. If both ground bias driver 775 and micbias driver 770 are not turned on, control passes to step 1150, else control passes to step 1160.

Steps 1150, 1155, 1175, 1180 and 1190 operate to determine button press and headset removal using the bias voltage provided by detect pulse received on path 792. Steps 1160, 1170, 1180 and 1190 operate to determine button press and headset removal using the bias voltage provided by micbias driver 770. Accordingly, button press detection and headset removal using the bias voltage from micbias driver is described first starting with step 1160.

In step 1160, a determination is made as to whether button is pressed in the inserted headset. As described above with reference to FIG. 7, comparator 725 and AND gate 745 together provide a logic value on path 755 indicating whether button is pressed or not. If button is pressed, button_det on path 755 is at logic high (1), else logic low (0). Control passes to step 1180 if button is pressed, else control passes to step 1170.

In step 1180, detector circuit 130 sends an interrupt to CPU 120 indicating that the button is pressed. CPU 120 performs operations (e.g., turning on/off micbias driver 770, speaker driver 760) responsive to receiving the interrupt. Control passes to step 1110 to detect the end of a call if the call is already initiated or to detect initiation of next call if previous call is already ended.

In step 1170, a determination is made as to whether a headset is present in the jack. Headset_detect on path 722 indicates whether a headset is present or not. Control passes to step 1110 if headset is present in the jack, else control passes to step 1190.

In step 1190, detector circuit 130 sets bit in control register 140 and also sends an interrupt to CPU 120 indicating that the headset has been removed. Control passes to step 1199. Steps 1110 to 1180 (all steps except 1190) are repeated until headset is removed. The description is continued with reference to button press and headset removal detection using the bias voltage provided by detect pulse.

In step 1150, switches 790-2 and 790-3 are closed to connect the detect pulse, which provides the required bias voltage to various components in detector circuit 130. Control passes to step 1155, in which a determination is made at the end of detect pulse (for example, at time point 812 of FIG. 8) as to whether button is pressed. Control passes to step 1180, if button is pressed, else control passes to step 1175.

In step 1175, a determination is made at the end of detect pulse as to whether headset is present in jack 240. Control passes to step 1110 if headset is present, else control passes to step 1190. Steps 1110 to 1180 (all steps except 1190) are repeated until headset is removed. The description is continued with reference to a method in which headset removal may be detected if the inserted headset is of stereo headset type.

16. Method of Headset Removal Detection in Case of a Stereo Headset

Figure 12:
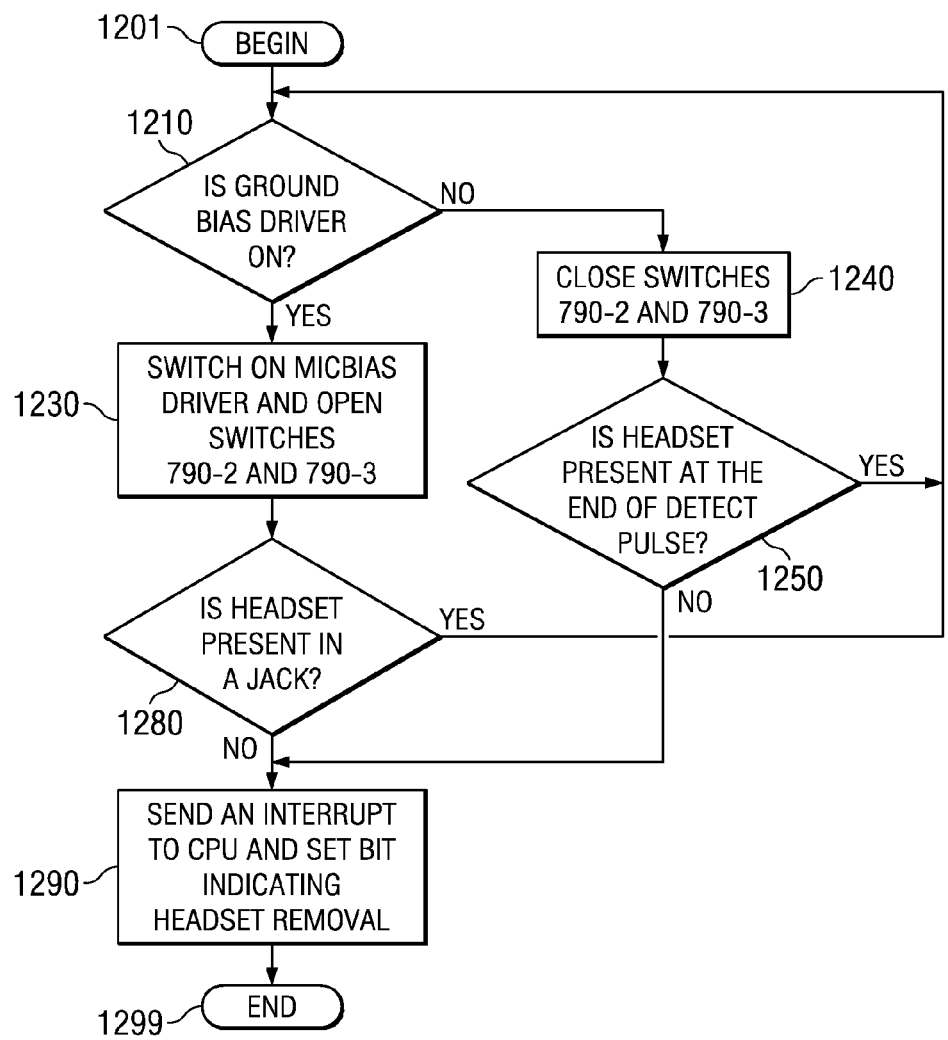
FIG. 12 is a flowchart illustrating the manner in which headset removal may be detected in stereo headset according to an aspect of the present invention.

FIG. 12 is a flowchart illustrating the manner in which headset removal may be detected in case the inserted headset is of a stereo headset type according to an aspect of the present invention. Steps 1210-1280 may be performed by CPU 120. The method begins in step 1201, in which control immediately passes to step 1210.

In step 1210, a determination is made as to whether ground bias driver 775 is turned on. As noted above, ground bias driver 775 provides the required ground bias voltage (for example, Vmid) to speakers in headset. If ground bias driver 775 is turned on, control passes to step 1230, else control passes to step 1240.

Broadly, steps 1240 and 1250 operate to determine whether a headset is removed (absent in jack) using the bias voltage provided by detect pulse received on path 792. Steps 1230 and 1280 operate to determine whether a headset is removed ("headset removal") using the bias voltage provided by micbias driver 770. Accordingly, headset removal detection using the bias voltage from micbias driver is described first starting with step 1230.

In step 1230, micbias driver 770 is switched on to provide the bias voltage to various components in detector circuit 130. In addition, switches 790-3 and 790-2 are opened since micbias driver and ground bias driver provides the bias voltage. Control passes to step 1280.

In step 1280, a determination is made as to whether a headset is present in jack 240. Headset_detect on path 722 indicates whether headset is present in the jack. Control passes to step 1210 if headset is present in the jack, else control passes to step 1290. Steps 1210 to 1280 are repeated until headset is removed.

In step 1290, detector circuit 130 sets a bit in control register 140 and sends an interrupt to CPU 120 indicating that the headset is removed. Control passes to step 1299, in which the method ends. The description is continued with reference to headset removal detection using the bias voltage provided by detect pulse.

In step 1240, switches 790-2 and 790-3 are closed to connect detect pulse to detector circuit 130, which provides the required bias voltage to various components in detector circuit 130. Control passes to step 1250, in which a determination is made as to whether the headset is present in the jack at the end of detect pulse. Control passes to step 1290 if the headset is not present, else control passes to step 1210. Steps 1210 to 1290 are repeated until the headset is removed.

From the above, it may be noted that detector circuit with cap less interface may detect headset insertion/removal, type of headset and button press. The description is continued with reference to a detector circuit with cap interface.

17. Detector Circuit with Cap Interface

Figure 13:
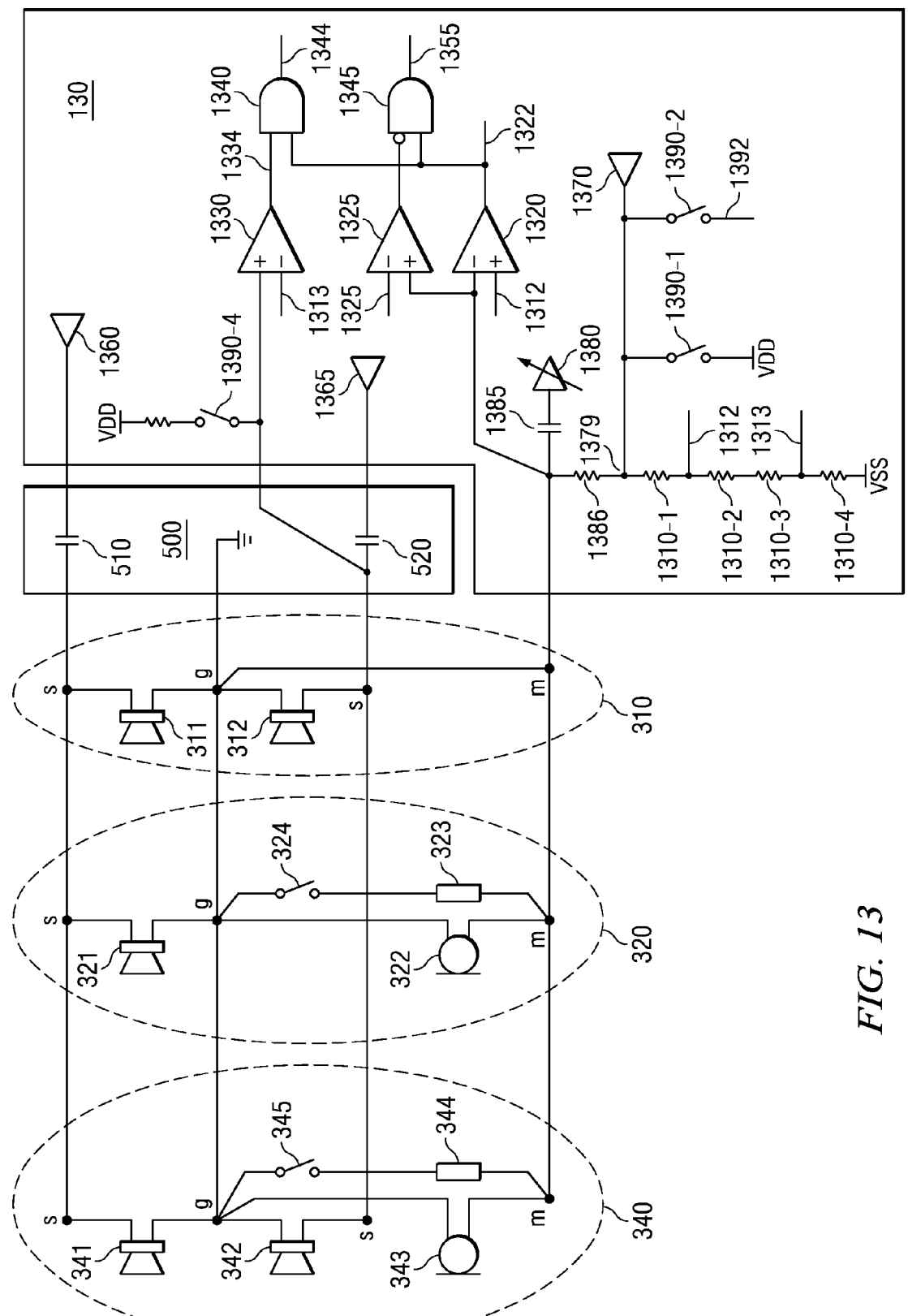
FIG. 13 is a circuit diagram illustrating the details of a detector circuit with cap-interface in an embodiment of the present invention.

FIG. 13 is a circuit diagram illustrating the details of detector circuit 130 with cap-interface 500 in an embodiment of the present invention. Merely for illustration, all headsets 310, 320 and 340 are shown connected, however, only one of headsets 310, 320 and 340 is connected at any instant of time. Detector circuit 130 is shown containing resistors 1310-1 through 1310-4 and 1386, comparators 1320, 1325 and 1330, AND gates 1340 and 1345, speaker drivers 1360 and 1365, micbias driver 1370, mic amplifier 1380, capacitor 1385, and switches 1390-1, 1390-2 and 1390-4.

Resistors 1310-1 through 1310-4 and 1386, comparators 1320, 1325 and 1330, AND gates 1340 and 1345, speaker drivers 1360 and 1365, micbias driver 1370, mic amplifier 1380, capacitor 1385, and switches 1390-1, 1390-2 and 1390-4 operate similar to resistors 710-1 through 710-4 and 786, comparators 720, 725 and 730, AND gates 740 and 745, speaker drivers 760 and 765, micbias driver 770, mic amplifier 780, capacitor 785, and switches 790-1, 790-2 and 790-4 of FIG. 7 respectively, and the description is not repeated here for conciseness. The signals on paths 1379, 1312, 1313, 1322, 1344 and 1355 indicate similar signals on paths 779, 712, 713, 722, 744 and 755 of FIG. 7 respectively. The differences of FIG. 13 from FIG. 7 are briefly described below.

Detector circuit 130 of FIG. 13 does not contain ground bias driver since ground terminal of speakers in cap interface 500 is connected to ground. Thus, switch similar to switch 790-3 of FIG. 7, which connects to Vss/ground is not required in FIG. 13. Detector circuit 130 of FIG. 13 may also be operated to detect insertion of headset, type of headset, removal of headset and button press in headset. The corresponding differences/extensions will be apparent to one skilled in relevant arts by reading the disclosure provided herein.

While various embodiments of the present invention have been described above, it should be understood that they have been presented by way of example only, and not limitation. Thus, the breadth and scope of the present invention should not be limited by any of the above described exemplary embodiments, but should be defined only in accordance with the following claims and their equivalents.

The invention claimed is:

1. A device enabling a user to play an audio signal, said device comprising:

a jack containing a plurality of connection points; and a detector circuit examining an impedance present between at least a pair of said plurality of connection points and determining whether a headset is present in said jack based on a value of said impedance;

wherein said detector circuit measures a voltage between said pair of said plurality of connection points and determines that said headset is present if said voltage is low compared to a reference voltage;

wherein said detector circuit comprises:

a first node being coupled to receive a bias voltage, wherein said first node is coupled to one of said pair of connection points and wherein the other one of said pair of connection points is coupled to Vss, whereby said bias voltage is presented at said first node if said headset is not present and a low voltage is presented at said first node if said headset is present; and a comparator having a first input terminal and a second input terminal, said first input terminal being connected to said first node, said second input being connected to said reference voltage, wherein said reference voltage is generated as a fraction of said bias voltage, wherein said comparator generates a signal having a first logical value if said headset is present and having a second logical value otherwise; and wherein said reference voltage equals (7* said supply voltage /8), wherein '*' represents multiplication operator and '/' represents division operator.

2. A device enabling a user to play an audio signal, said device comprising:
- a jack containing a plurality of connection points; and
- a detector circuit examining an impedance present between at least a pair of said plurality of connection points and determining whether a headset is present in said jack based on a value of said impedance;
- wherein said detector circuit measures a voltage between said pair of said plurality of connection points and determines that said headset is present if said voltage is low compared to a reference voltage;
- wherein said detector circuit comprises:
  - a first node being coupled to receive a bias voltage, wherein said first node is coupled to one of said pair of connection points and wherein the other one of said pair of connection points is coupled to Vss, whereby said bias voltage is presented at said first node if said headset is not present and a low voltage is presented at said first node if said headset is present; and
  - a comparator having a first input terminal and a second input terminal, said first input terminal being connected to said first node, said second input being connected to said reference voltage, wherein said reference voltage is generated as a fraction of said bias voltage, wherein said comparator generates a signal having a first logical value if said headset is present and having a second logical value otherwise; and
- wherein said detector circuit further comprises:
- a resistor connecting said first node to a second node;
- a micbias driver providing a driver voltage on said second node to bias any microphone present in said headset; and
- a first switch to couple a supply voltage to said second node when in a closed state, said first switch being in a open state if said micbias driver is providing said driver voltage on said second node.

3. The device of claim 2, wherein said detector circuit further comprises:
- a plurality of components detecting a type of said headset, wherein said plurality of components are turned off if said headset is determined to be absent.

4. The device of claim 3, wherein said detector circuit determines whether said headset is removed from said jack after determining that said headset is present in said jack, said detector circuit further comprising:
- a second switch to couple a detect pulse to said second node when in a closed state, said third switch being in a open state if said micbias driver is turned on, said detect pulse being of short pulse width and being repeated with a long period, thereby reducing total power consumption of said device.

5. The device of claim 4, further comprising:
- a processing unit receiving an interrupt from said detector circuit if said headset is determined to be present; and
- a register storing a bit indicating said headset is determined to be present.

6. A device enabling a user to play an audio signal, said device comprising:
- a jack containing a plurality of connection points, said jack being designed to receive a first headset, said first headset making contact with at least one of said plurality of connection points upon insertion into said jack; and
- a detector circuit measuring an impedance between at least one pair of said plurality of connection points and determining a type of said first headset according to said impedance;
- wherein said type comprises one of a stereo headset type, a cellular headset type and a stereo+cellular headset type according to said impedance;
- wherein said detector circuit determines whether said first headset is of said stereo headset type by measuring a first voltage between a first pair of said plurality of connection points and determines that said first headset is a stereo headset type if said first voltage is low compared to a reference voltage;
- wherein said detector circuit determines whether said first headset is a cellular headset type by measuring a second voltage between a second pair of said plurality of connection points if said first headset is determined not to be of said stereo headset type and determines that said first headset is of said cellular headset type if said second voltage is high compared to said reference voltage; and
- wherein said detector circuit comprises:
  - a third node being coupled to receive a supply voltage, wherein said third node is coupled to one of said second pair of connection points and wherein the other one of said second pair of connection points is coupled to Vss, whereby said supply voltage is presented at said third node if said first headset is of said cellular headset type and a low voltage is presented at said third node if said first headset is not of said cellular headset type; and
  - a second comparator having a first input terminal and a second input terminal, said first input terminal being connected to said third node, said second input terminal being connected to said reference voltage, wherein said second comparator generates a second signal having a first logical value if said first headset is of said cellular headset type and having a second logical value otherwise.

7. The device of claim 6, wherein said detector circuit determines that said first headset is a stereo+cellular headset type if said first headset is determined not be of either of of said stereo headset type and said cellular headset type.

8. The device of claim 7, wherein said second pair of connection points comprise a connection point which connects to a speaker terminal and another connection point which connects a ground terminal in said first headset.

9. The device of claim 8, further comprising:
- a resistor connecting said first node to a second node;
- a micbias driver providing a driver voltage on said second node to bias any microphone present in said first headset;
- a first switch to couple said supply voltage to said second node when in a closed state, said first switch being in a open state if said micbias driver is providing said driver voltage on said second node; and
- a second switch to couple said supply voltage to said third node through a second resistor when in a closed state, said second switch being in a open state if said first headset is determined to be of said stereo headset type.

10. The device of claim 9, wherein said detector circuit determines whether a button is pressed if said first headset is of said stereo+cellular headset type or cellular headset type, wherein said first comparator is designed to indicate whether said button is pressed.

11. The device of claim 10, wherein said detector circuit determines whether said button is pressed, said detector circuit further comprising a third switch to couple a detect pulse to said second node when in a closed state, said third switch being in a open state if said micbias driver is turned on, said detect pulse being of short pulse width and being repeated with a long period, thereby reducing total power consumption of said device.

12. The device of claim 11, wherein said reference voltage equals (said supply voltage /8), wherein '/' represents a division operator.

13. The device of claim 12, further comprises a register, wherein said register comprises a plurality of bits indicating a type of said first headset.

14. The device of claim 13, further comprises a processing unit receiving an interrupt from said detector circuit if said button is determined to be pressed.

* * * * *